Figure 1:
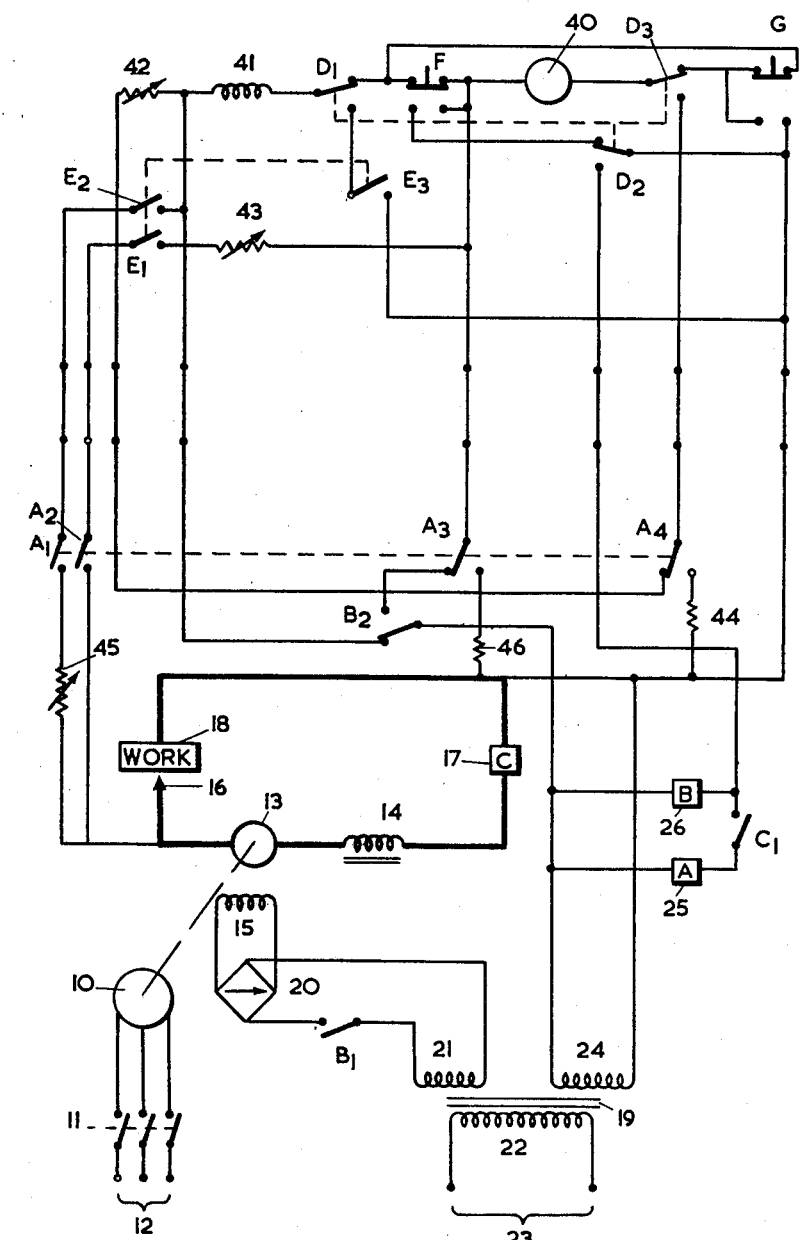

United States Patent Office 3,138,735
Patented June 23, 1964

3,138,735
ELECTRIC ARC WELDING
William Matthew Hudson, North Fenham, and Jack Asher King, Gosforth, Newcastle-upon-Tyne, England, assignors to The British Oxygen Company Limited, a British company
Filed Feb. 17, 1961, Ser. No. 90,005
Claims priority, application Great Britain Feb. 19, 1960
4 Claims. (Cl. 314—69)

This invention relates to electric arc welding, and in particular to systems for feeding a consumable electrode to a welding arc.

It has previously been proposed to feed an electrode wire to a welding arc by means of a series wound electric motor having its armature winding and field winding connected in series across a welding arc, whereby automatic compensation of electrode feed speed is obtained if the arc voltage applied across these windings should change due to a change of arc length. For some processes of consumable electrode arc welding the operating characteristics of a shunt wound electric motor are more suitable for feeding of the electrode than those of a series wound electric motor. However, a conventional shunt wound D.C. electric motor cannot normally be operated on alternating current for use as an electrode feed motor.

It is an object of the present invention to enable an electrode feed motor to behave during welding in the manner of a D.C. shunt wound electric motor even when energised by alternating current.

According to one aspect of the present invention in an electric arc welding system of the kind in which an electrode is fed to the welding arc by an electric motor having an armature and a field winding, the armature and field winding of the motor are arranged to be connected in series to an alternating current supply for inching and for slowly feeding the electrode towards a workpiece preparatory to welding and said armature and field winding are arranged to be energised from the welding supply during welding being connected in parallel across the welding arc.

According to another aspect of the present invention, in an electric arc welding system of the kind in which an electrode is fed to the welding arc by an electric motor arranged to be energised from across the welding arc during welding, the motor has a field winding and an armature winding arranged to be connected in series and energised by an alternating current for inching or slow feeding of the electrode, while during welding, the armature winding is arranged to be connected across the welding arc and the field winding is arranged to be connected in parallel with the armature across the welding arc so that the characteristics of the electric motor during normal feeding of the electrode during welding approximate to those of a direct current shunt wound motor with regard to relatively constant motor speed with respect to load and to the dependence of the motor speed on the applied armature voltage.

Where the welding arc is supplied from an alternating current source by way of a welding transformer the field winding may be energised from this source by way of an auxiliary transformer whose primary winding is connected in parallel with the primary winding of the welding transformer. The field winding may be supplied from the winding of the welding transformer supplying the welding current if the auxiliary transformer is omitted.

Alternatively, the primary winding of the auxiliary transformer may be energised from a second source of alternating current which is generally in phase with the source connected to the welding transformer.

Figure 2:
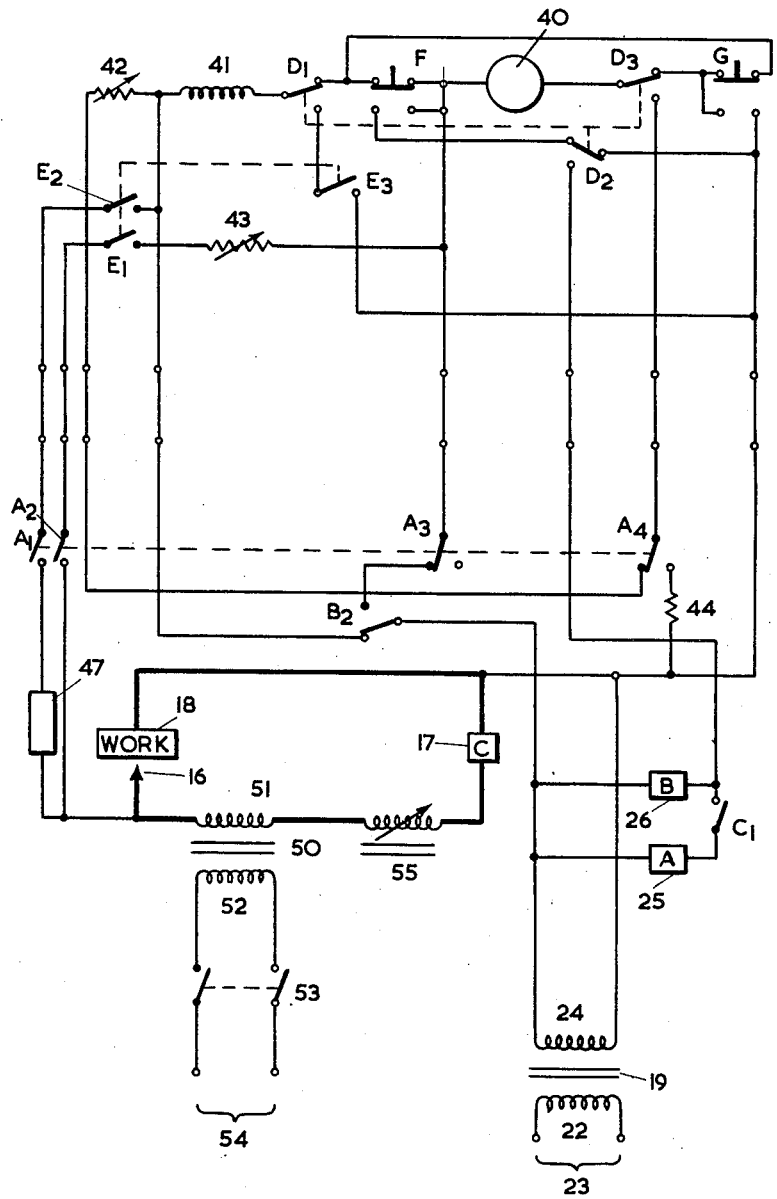
Figure 3:
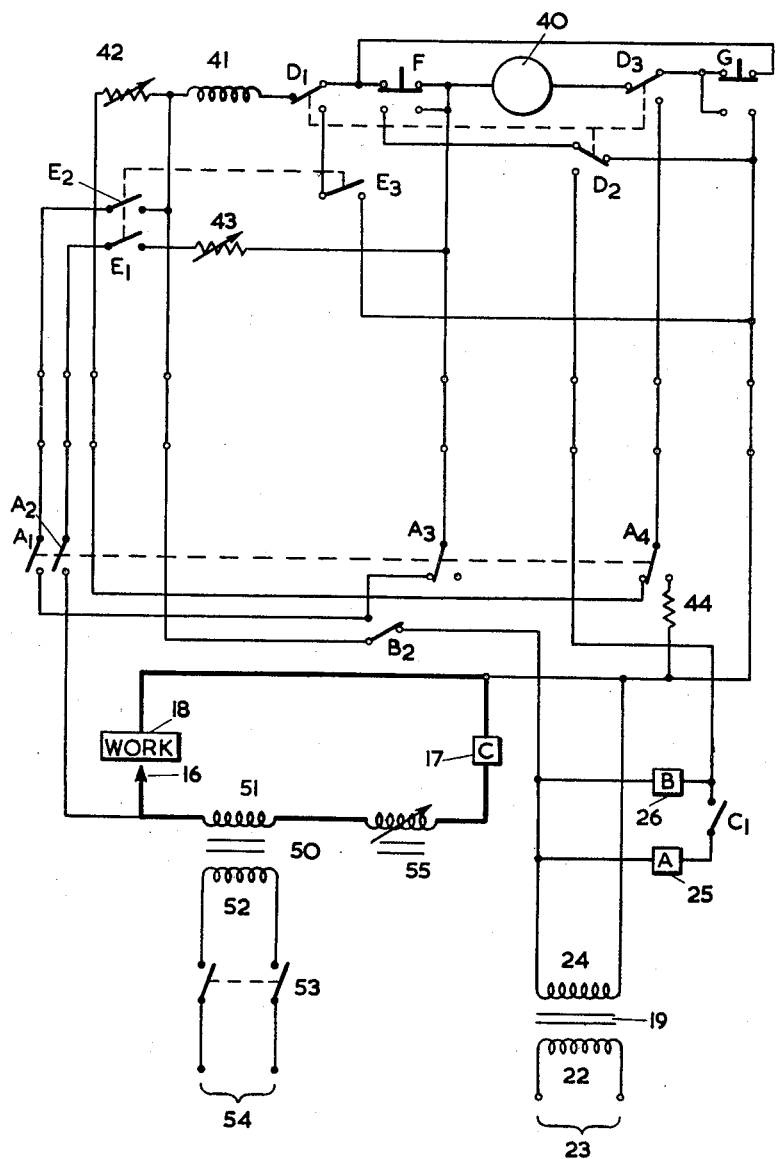

Three arrangements in accordance with the present invention will now be described by way of example with reference to the accompanying drawings in which:

FIGURE 1 shows a circuit diagram of a system in which the welding current supply is obtained from a motor generator set driven from alternating current; and FIGURE 2 shows a circuit diagram of an alternative arrangement in which the welding current supply is obtained from a welding transformer and in which the field winding of the electrode feed motor is arranged to be fed from across the welding arc during welding; and FIGURE 3 shows a modification of the arrangement shown in FIGURE 2 in which the field winding of the electrode feed motor is arranged to be energised from an alternating current supply generally in phase with the welding current.

In the arrangement shown in FIGURE 1 a motor generator set is used to provide a direct current welding supply. The motor generator set has a motor 10 fed through a contactor 11 from an alternating current supply 12. The motor 10 drives a direct current welding generator 13 having a series field winding 14 and a shunt field winding 15. One pole of the generator 13 is connected through sliding contacts (not shown) to an electrode indicated diagrammatically at 16. The other pole of the generator 13 is connected through the series field winding 14 and the operating winding of a current relay 17 to the work indicated diagrammatically at 18. The shunt field winding 15 is fed from a rectifier bridge 20 through normally open contacts B1 of a relay from a winding 21 of a transformer 19 having a primary winding 22 fed from an alternating current supply 23. This transformer 19 also has a further secondary winding 24 which provides an auxiliary alternating current supply. One end of the winding 24 is connected to the work 18 while the other is connected to the operating windings 25 and 26 respectively of relays A and B respectively. This end of the secondary winding 24 is also connected to the change-over contact B2 operated by the relay B, which as above mentioned also has the normally open contact B1 in the circuit for supplying the shunt field winding 15 of the welding generator through the rectifier bridge 20.

The welding head has an electrode feed motor with an armature 40 and a field winding 41. It will become apparent from the following description that the switching arrangements provided in the control system are arranged to connect the armature 40 and the field winding 41 in series across an alternating current supply obtained from the auxiliary winding 24 for inching and for electrode feeding prior to the establishment of the welding arc and that after the welding arc has been established the armature 40 and the field winding 41 are arranged to be connected in parallel and fed from the supply obtained from across the welding arc. These switching arrangements include a contactor switch having three pairs of change-over contacts D1, D2 and D3 there is also an electrode feed switch having normally open contacts E1, E2 and E3. Inching switches F and G are provided with change-over contacts. Before welding is started the relays A, B and C are not energised and their contacts are in the positions shown in FIGURE 1. The switches D, E, F and G are also in the positions shown. If one of the inching switches for example the switch F is depressed one pole of the armature 40 is connected through the contacts of the switch F and through the contacts D2 to one end of the auxiliary winding 24 of the transformer 19. The other pole of the armature 40 is connected through the contacts D3 and the normally closed contacts of the inching switch G and thence through the contacts D1 and the field winding 41 and through the contacts B2 to the other end of the auxiliary winding. This causes the electrode feed motor to be energised with the armature 40 in series with the field 41 so that the electrode is fed by the electrode feed motor in the desired direction of inching. If instead of pressing the inching switch F the inching switch G had been pressed the connections to the armature 40 would be reversed so that the electrode feed motor would rotate in the opposite direction. In this case when the inching switch G is pressed the first mentioned pole of the armature 40 is connected through the normally closed contacts F and the contacts D1 and the field winding 41 and thence through the contacts B2 to one end of the auxiliary winding 24. The other pole of the armature 40 is connected through the contacts D3 and the operated contacts of the inching switch G to the other end of the auxiliary winding 24.

To prepare for welding the electrode feed switch having the contacts E1, E2 and E3 is operated to close these three contacts and also the welding contactor having the contacts D1, D2 and D3 as energised. By the changing over of the contact D2 the operating winding 26 of the relay B is energised from the auxiliary winding 24 of the transformer 19. This closes the contact B1 causing the shunt field 15 of the generator to be energised from the winding 21 of the transformer 19 through the rectifier bridge 20. The switch 11 already having been closed, the motor 10 is driving the armature of the generator 13 so that an open circuit voltage appears between the electrode 16 and the work 18. The energisation of the relay B cause the contacts B2 to change over thereby connecting one pole of the armature 40 of the electrode feed motor to one end of the auxiliary winding 24 of the transformer. The other pole of the armature 40 is connected through the contact D3 which has been changed over, and through the contact A4 and thence through an adjustable resistance 42 to the field winding 41 of the electrode feed motor. The other end of the field winding 41 is connected through the contact D1 which has been changed over and through the contact E3 to the other end of the auxiliary winding 24 of the transformer 19. In this position the electrode feed motor feeds the electrode forward towards the work at a speed which can be controlled by adjustment of the resistance 42 the armature 40 and field winding 41 of the electrode feed motor being connected in series and fed from the auxiliary winding 24 of the transformer 19.

As above mentioned the generator has been energised so that an open circuit voltage appears between the electrode 16 and the work 18. When the electrode touches the work current flows in the welding circuit causing the energisation of the operating winding 17 of the current relay C. This causes the contact C1 to close energising the operating winding of the relay A from the auxiliary winding 24 through the contacts D2 which have been changed over. This causes the contacts A1, A2, A3 and A4 to be changed over. One end of the armature 40 of the electrode feed motor is then connected through an adjustable resistance 43 the contacts E1 and A2 to the electrode 16 while the other end of the armature 40 is connected through contacts D3 and A4 and a fixed resistance 44 to the work 18. One end of the field winding 41 of the electrode feed motor is connected through the contacts D1 and E3 to the work while the other end of the field winding 41 is connected through the contacts E2 and A1 and an adjustable resistance 45 to the electrode 16. It will be seen that in this condition the armature 40 and the field winding 41 of the electrode feed motor are connected in parallel (through associated series resistances) across the welding arc appearing between the electrode 16 and the work 18. It will be noted that except when the motor is connected as a series motor for inching and slow feeding an additional dynamic braking resistor 46 is connected across the armature winding. When welding with a very short arc any over-speeding of the feed motor causes the electrode to dig into the work piece. However, the slight increase of field current and hence flux density tends to retard the armature and prevent over-speeding and decreases the speed of response of the electrode feed motor to a change of arc voltage thus tending to reduce the response to transient variations thereby increasing the stability of the system.

We have found that with a control circuit arranged to operate in the manner above described in which during welding the armature and the field winding of the electrode feed motor are connected in parallel across the welding arc during welding there is an appreciable reduction in disturbances to the welding conditions arising from changes in the length of the welding arc due for example to the arc passing over a tack weld or similar change in the surface to be welded.

With this arrangement, a variation in arc length during welding alters the voltage applied across the armature winding. If the arc lengthens then this voltage increases and the electrode feed increases. If the motor tends to over-run, then the back electromotive force will be greater than the applied voltage and braking of the motor will occur. Decrease of arc length will cause a fall in the applied voltage, and the electrode feed speed will decrease.

FIGURE 2 of the accompanying drawings shows a modification of the arrangement above described in which the welding current is obtained from a welding transformer instead of from a motor generator set. In this arrangement a welding transformer 50 has a secondary winding 51 which is connected in the welding circuit and a primary winding 52 which is connected through a welding contactor 53 to an alternating current supply 54. In the welding circuit the secondary winding 51 is connected in series with an adjustable inductance 55 and the winding 17 of the current relay C. It will be seen that in FIGURE 2 the arrangements closely associated with the electrode feed motor and shown in the upper part of the figure are identical with those in FIGURE 1 while some minor changes have been made to the control circuit connections in the lower part of the figure. The arrangement for inching and for feeding the electrode slowly towards the work are as above described with reference to FIGURE 1, the armature 40 and the field winding 41 of the electrode feed motor being connected in series and supplied from the auxiliary winding 24 of an auxiliary transformer.

In preparation for the welding operation the contactor 53 is closed to energise the welding transformer 50 so that an open circuit voltage appears between the electrode 16 and the work 18. When the electrode 16 touches the work 18 welding current flows in the welding circuit energising the operating winding 17 of the relay C which causes the contact C1 to close energising the operating winding of the relay A. The contact A1 and A2 are closed and the contact A3 and A4 are changed over from the position shown. One pole of the armature 40 of the electrode feed motor is connected through the adjustable resistance 43 and contacts E1 and A2 to the electrode 16 while the other pole of the armature 40 is connected through the contacts D3 and A4 and a resistance 44 to the work 18. The field winding 41 of the electrode feed motor is connected through the contacts E2 and A1 and a phase advancing device 47 to the electrode 16. The other end of the field winding 41 of the electrode feed motor is connected through the contacts D1 and E3 to the work 18.

It will be noted that in the arrangement above described with reference to FIGURE 2 of the accompanying drawings the armature and field windings 40 and 41 respectively of the electrode feed motor are connected in series for inching and for feeding the electrode forward slowly in preparation for the initiating of the welding arc but they are connected in parallel (through associated resistances) and are fed from the welding circuit during welding operations.

With the arrangement above described the field current is proportional to the arc voltage. Arc lengthening tends to speed up the electrode feed motor by increasing the potential applied to the armature. If the arc shortens, the back electromotive force of the motor exceeds the applied voltage and dynamic braking occurs.

The characteristics of the shunt wound D.C. motor that are obtained by the use of the invention are relatively constant speed with respect to load and the dependence of motor speed on the applied armature voltage. In the case of a direct current welding arc the regulating resistor arranged to adjust the arc voltage also acts as a dynamic braking resistor.

FIGURE 3 of the accompanying drawings shows a modified arrangement which is somewhat similar to that shown in FIGURE 2. The arrangements during inching and slow feeding of the electrode towards the work are as above described with reference to FIGURE 2. During welding, however, the field winding 41 of the electrode feeding motor is arranged to be energised from the auxiliary winding 24 of the transformer 19 so that the field winding is fed from the alternating current supply 23 instead of being fed from across the welding arc. One end of the field winding 41 is connected during welding through the contacts E2 and A1 and thence through the contacts B2 to one end of the auxiliary winding 24 while the other end of the field winding 41 is connected through the contacts D1 and E3 to the other end of the auxiliary winding 24. In this way the field winding 41 is energised from a separate source so that the characteristics of the electrode feeding motor are substantially those of the shunt fed motor. It is of course necessary that the current in the field winding 41 should be substantially in phase with the current in the armature 40.

In the case of an alternating current welding arc it is not necessary that the currents in the field winding and the armature are exactly in phase, and it is believed that these currents can be 20° out of phase without losing the advantage of the present invention.

We claim:

1. An electric arc welding system comprising a consumable electrode, welding current power supply means selectively energising the electrode, electric motor feed means for selectively feeding said electrode toward a workpiece to establish an arc between said electrode and said workpiece, said electric motor including an armature and a field winding, an alternating current supply, first switching means selectively connecting said armature and said field winding in series with each other and to said alternating current supply for actuating said motor to feed said electrode towards said workpiece, and second switching means actuated by passage of welding current between said electrode and said workpiece to connect said armature and field winding in parallel with each other.

2. An electric arc welding system according to claim 1 in which resistors are connected in series with the armature and field winding during welding.

3. An electric arc welding system comprising a consumable electrode, a first alternating current supply, a welding transformer connecting said electrode and said first alternating current supply, electric motor feed means slectively feeding said electrode toward a workpiece to establish an arc therebetween, said motor including an armature and a field winding, a second alternating current supply, first switching means selectively connecting said armature and said field winding in series with each other and to said second alternating current supply for selectively feeding said electrode toward said workpiece, and second switching means actuated by passage of energy between said electrode and said workpiece to connect said armature and said field winding in parallel with each other.

4. An electric arc welding system comprising a consumable electrode, a first alternating current supply, a welding transformer connecting said electrode and said current supply, electric motor feed means for selectively feeding said electrode toward a workpiece to establish an arc therebetween, said motor including an armature and a field winding, a second alternating current supply, a first switching means selectively connecting said armature and said field winding in series with each other and to said second alternating current supply for feeding said electrode toward said workpiece, and second switching means actuated by passage of energy between said electrode and said workpiece to connect said armature and said field winding in parallel and to connect said field winding to said second alternating current supply not in excess of 20 degrees out of phase.

References Cited in the file of this patent

UNITED STATES PATENTS 2,103,727    Kennedy _____ Dec. 28, 1937